Dec. 22, 1970

J. W. BADHAM ET AL  3,549,685
PROCESS FOR THE HYDRODIMERISATION OF α,β-MONO-OLEFINIC
NITRILES AND ESTERS OF α,β-MONO-OLEFINIC
CARBOXYLIC ACIDS
Filed Aug. 16, 1967

INVENTORS
JOHN WILKINSON BADHAM
PETER JOHN GREGORY
JOHN BARRINGTON GLEN

By

Cushman, Darby & Cushman
ATTORNEYS 3,549,685
PROCESS FOR THE HYDRODIMERISATION OF α,β-MONO-OLEFINIC NITRILES AND ESTERS OF α,β-MONO-OLEFINIC CARBOXYLIC ACIDS
John Wilkinson Badham, Balwyn, Victoria, Peter John Gregory, Toorak, Victoria, and John Barrington Glen, East Malvern, Victoria, Australia, assignors to Imperial Chemical Industries of Australia and New Zealand Limited, Melbourne, Victoria, Australia, an Australian company
Filed Aug. 16, 1967, Ser. No. 661,063
Claims priority, application Australia, Aug. 22, 1966, 9,957/66; Sept. 12, 1966, 10,919/66
Int. Cl. C07c 121/26
U.S. Cl. 260—465.8                                     5 Claims

ABSTRACT OF THE DISCLOSURE

A process for the reductive dimerisation of α,β-mono-olefinic nitriles or esters of α,β-mono-olefinic carboxylic acids (especially of acrylonitrile to adiponitrile) by means of alkali metal or alkaline earth metal amalgam in a medium providing protons and comprising a major proportion of a polar aprotic solvent, in which process the metal transferred from the amalgam to the organic medium during the reductive dimerisation is reacted then or subsequently with a neutralising acid, an improved method of separating the resulting salt of the metal with the neutralizing acid from the rest of the reaction mixture wherein the organic medium, either during or after the reductive dimerisation, is contacted with a separate aqueous phase so as to transfer the metal, whether as ion or salt and whether in solution or as solid, to the aqueous phase, to complete, if necessary, the reaction of the metal with the acid by adding more acid, and to complete, if necessary, precipitation of the metal salt, and then to isolate the metal salt from the aqueous phase. The process is particularly applicable to the separation of sodium bicarbonate resulting from the use of sodium amalgam with carbon dioxide as the neutralising acid.

---

Figure 1:
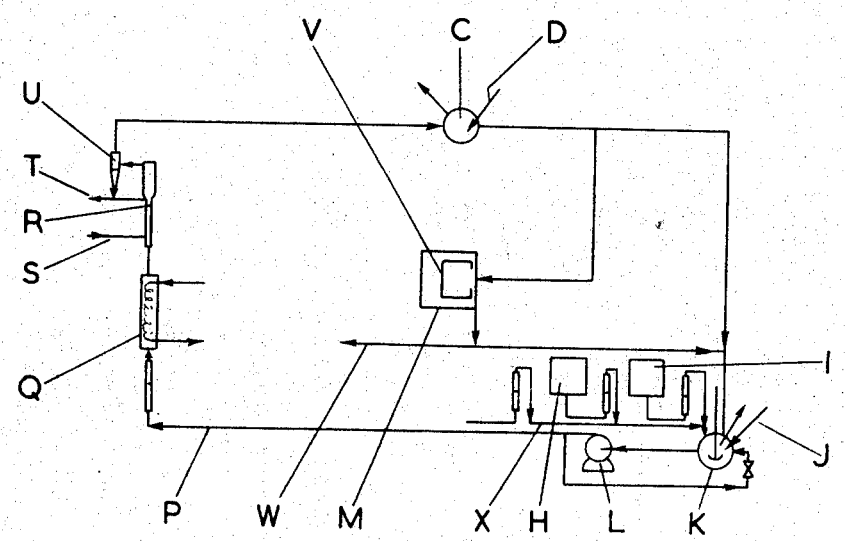

This invention relates to a process for the manufacture of dicarboxylates and dinitriles; in particular it relates to the hydrodimerisation of acrylonitrile to adiponitrile. The hydrodimerisation of acrylonitrile to adiponitrile according to the schematic equation

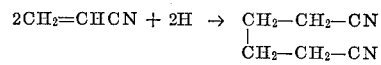

has been disclosed by Knunyants and Vyzankin (Bull. Acad. Science, U.S.S.R., 1957, pp. 238–240) who used as the reducing agent an amalgam of mercury and an alkali metal, and strong hydrochloric acid as the medium containing the acrylonitrile in dilute solution. With this system adiponitrile was formed, but a large proportion of the acrylonitrile was converted to propionitrile and this has made the process uneconomic. In British Pat. No. 1,063,497 we have described an improved process of reductive dimerisation of olefinic compounds selected from the group consisting of alpha, beta mono-olefinic nitriles and esters of aliphatic alpha, beta mono-olefinic carboxylic acids, especially acrylonitrile, wherein the reductive dimerisation is carried out in a medium capable of providing reactive hydrogen by reacting a metal amalgam selected from the group consisting of alkali and alkaline earth metal amalgams with said medium in the presence of at least one salt capable of forming alkylated cations in said medium. These alkylated cationic salts promoting the hydrodimerisation reaction and defined in said patent will be referred to hereinafter as "onium" additives.

A preferred modification of this process is the subject of Dutch patent application No. 6,613,474 wherein the reaction is carried out in a reaction medium containing a major proportion of a polar aprotic solvent, preferably acetonitrile and/or adiponitrile, together with an "onium" additive. In our Dutch patent application No. 6,617,641 there is described a preferred method of operating both above-defined hydrodimerisation processes characterised in that the amalgam phase and the phase containing the monomer are maintained in turbulent motion, preferably in what may be termed a "dense fluidised bed" consisting of between 65 and 20 percent by volume of amalgam and between 35 and 80 percent by volume of other phases. Said application also describes apparatus for carrying out this process in a preferred embodiment of the "dense fluidised bed" which, in our Dutch patent application No. 6,617,641, is defined further as a fluidised bed in which the amalgam is not disintegrated into particulate droplets but remains as an essentially physically inter-connected fluid in which the voids formed by the other phases alternate rapidly and pass through the amalgam.

Other hydrodimerisation processes to which the present invention is applicable are described in Dutch patent application No. 6,609,103, and French Pat. No. 1,467,091.

When these processes, particularly the process using the medium as defined in Dutch patent application No. 6,-613,474 in conjunction with the "dense fluidised bed," are scaled up e.g. in glass or steel equipment, the formation of extremely fine particles of the neutralisation product of the alkali or alkaline earth metal, particularly of sodium bicarbonate and, perhaps, also of sodium sesquicarbonate and sodium carbonate, causes certain difficulties; the precipitated solid may be deposited on the walls of the reactor and transfer lines and scaling and blockages may result; when precipitated from organic media the salt particles are so fine that filtration is relatively slow and occlusion of large amounts of organic matter and mercury in the precipitated salts, e.g. sodium bicarbonate, occurs. These difficulties can be overcome by plant design e.g. by provisions against blockages, choice of special materials of plant construction, very much larger scale of filtration equipment and purification processes; however, these remedies are expensive.

We have now found that the difficulties resulting from precipitation of alkali and alkaline earth metal salts, particularly sodium bicarbonate, sesquicarbonate and carbonate, in the presence of large quantities of organic media in the hydrodimerisation reaction can be overcome if said salt and/or metal ions are rapidly transferred during or, preferably, after the reaction from the organic phase to a separate aqueous phase.

Accordingly we provide an improved process of reductive dimerisation of olefinic compounds selected from the group consisting of alpha-beta mono-olefinic nitriles and esters of aliphatic alpha-beta mono-olefinic carboxylic acids, wherein the reductive dimerisation is carried out in a medium comprising a major proportion of a polar aprotic solvent and capable of providing reactive hydrogen by interaction with a metal amalgam selected from the group consisting of alkali and alkaline earth metal amalgams with said medium, wherein the amalgam phase and the phase containing the monomer are maintained in agitation, and wherein the alkali or alkaline earth metal transferred in the reactor from the amalgam to the organic phase is subsequently reacted with a weak acid, particularly carbon dioxide, in which process the improvement is characterised in that the alkali and alkaline earth metal ions and/or salts present in the orgnic phase are rapidly transferred to and/or precipitated in a separated aqueous phase during or after the reaction and are then recovered. For simplicity this process is referred to hereinafter broadly as the "aqueous quench process" and the transfer of said alkali or alkaline earth metal is referred to as the "aqueous quench." The aqueous phase may be contacted with the organic phase before, during or after the latter passes through the reactor; we prefer, however to transfer the alkali or alkaline earth metal into the aqueous phase after the hydrodimerisation reaction, preferably at a high rate of mass transfer, by contacting the organic phase (reaction product) exit stream from the reactor after disengagement from the bulk of the amalgam with an aqueous phase.

A preferred mode of operation of this invention is a process wherein the hydrodimerisation reaction is carried out in the presence of at least one "onium" additive, substantially in the absence of an aqueous phase, and the amalgam phase and the phase containing the monomer are maintained in turbulent motion and wherein the organic phase reaction product exit stream from the hydrodimerisation reactor is allowed to disengage from the amalgam phase and, immediately thereafter, is contacted rapidly and intimately with a separate pH controlling aqueous phase to effect transfer of alkali or alkaline earth metal from the organic phase to said aqueous phase, the aqueous and organic phases are separated and part of the organic phase, substantially free from aqueous phase, is recycled to the reactor.

It is not clear whether in the transfer of the alkali or alkaline earth metal from the organic phase to the aqueous phase said metal is in the state of an ion, a molecule, or a salt crystal nucleus or, partly, in two or all three of these states. In our preferred method of operation the transfer occurs so rapidly and solid particles, if formed at all, are so minute, that clarity on this point is diffiicult to attain. However, in any case no substantial formation of crystals occurs in the organic phase, i.e. not less than 90% and, preferably, more than 99% of the weight of all crystals recovered is grown in the aqueous phase. Accordingly our process is characterised further in that more than 90% w./w. and preferably more than 99% w./w. of the recovered crystals of the precipitated alkali or alkaline earth metal are grown in the aqueous phase.

We prefer particularly to separate the mixing step of the organic and aqueous phases from the precipitation step of the alkali or alkaline earth metal salt.

Accordingly a preferred process comprises contacting the organic reaction product stream from the reactor, after disengagement from the amalgam, intimately with sufficient aqueous phase to extract the alkali or alkaline earth metal without precipitation of the latter, reducing the pH in the organic phase to a value less than 10.5, preferably less than 9.5, separating the organic and aqueous phases while they are substantially free from solid salt crystals, subsequently precipitating the alkali or alkaline earth metal salt from the aqueous phase, splitting the organic phase into a recycle stream and a recovery stream, recycling the recycle stream substantially free from aqueous phase to the reactor, and recovering the desired products and reagents from the recovery stream and from the aqueous phase respectively. Precipitation of the alkali or alkaline earth metal salt is achieved by cooling, addition of further weak acid, particularly carbon dioxide, evaporation or a combination of these and other known techniques.

Although the aqueous quench process, in any of its variants, produces the substantial advance that crystals formed in the aqueous phase are much larger and more readily filtrable than those formed in the organic phase, crystal size may still vary widely and apparently inconsistently with operating conditions; thus the average length of sodium bicarbonate crystals may vary erratically from 20 to 200 microns and consistency of crystal size is difficult to obtain. We have now found further, and this is a critical advantage for consistent ease of operation of our process, that after transfer from the organic to the aqueous phase consistently large crystals of the alkali or alkaline earth metal salt, particularly sodium bicarbonate, may be obtained if the organic phase fed to the reactor is maintained essentially free from solid crystals or nuclei of alkali or alkaline earth metal salt by keeping the concentration of dissolved alkali or alkaline earth metal salt below 0.5 mole/litre. The form in which the dissolved alkali or alkaline earth metal is present is not critical— although as a rule most of it will be present as dissolved salt; its total concentration is readily determined by titration, flame photometry or atomic spectroscopy.

Accordingly a preferred mode of operation of our process comprises maintaining the concentration of the alkali or alkaline earth metal in the organic phase in the feed to the reactor and preferably throughout all steps following the aqueous quenching step, i.e. during the phase separation of the organic and aqueous phases and during the recycle of organic phase to the reactor below 0.5 mole per litre. If this condition is observed and the period between disengagement of the organic phase from the amalgam and contacting of organic and aqueous phases is kept short, preferably below 20 seconds, then during the short transfer of the organic phase from the reactor to the aqueous quenching step in the extractor surprisingly high concentrations, e.g. up to 0.95 mole/litre of alkali or alkaline earth metal can be tolerated in the reactor exit stream without observable formation of undesired crystal nuclei.

In view of the fact that there is an upper limit of alkali metal or alkaline earth metal concentration in the organic phase it was particularly unexpected to find that there is also a preferred lower limit of said concentration. We have found that, whenever less than $1 \times 10^{-3}$ mole/litre of alkali or alkaline earth metal is present in solution in the organic phase, phase separation between it and the aqueous phase after the extraction step is slow and entrainment of water in the organic phase is difficult to avoid. The latter is particularly undesirable as it leads to lower yields of dimer, particularly adiponitrile, in the reactor.

Accordingly our process is further characterised in that the concentration of the alkali or alkaline earth metal in the organic phase resultant from the aqueous extraction process is maintained above $1 \times 10^{-3}$ mole/litre.

The work-up of the reaction products and unreacted reactants and reagents is not narrowly critical and several variants are possible. Thus the solid alkali or alkaline metal salt crystals may be filtered before separation of the aqueous and organic phases and the solutions may then be separated and recycled and/or worked up. As already stated we prefer, however, to separate the organic and aqueous phases first and to form and filter the solid alkali or alkaline earth metal salts in the aqueous phase only. Separation of said metal salt crystals is effected by conventional means e.g. a nutsche, a centrifuge or a settling vessel. The oranic reaction product, adiponitrile, unreacted reagent and "onium" additive are recovered from the organic phase e.g. by splitting off a side stream and distilling it, while the bulk of the organic medium comprising reaction product, some "onium" additive and the polar aprotic solvent is recycled to the reactor; the aqueous stream together with necessary make-up water is also recycled to the point at which it is contacted with the organic reactor exit stream. Unused recovered reagents may be recycled and make-up reagents are fed to the reactor. Under steady state conditions in the phase separator the organic stream is essentialy saturated with water and the water phase is essentially saturated with respect to the predominant organic medium; the other constituents including the alkali or alkaline earth metal ions and salts are in dynamic equilibrium between the two phases; it will, however, be understood that during plant operation an ideal steady state is not attained and that minor fluctuations occur constantly; it will also be apparent that the proportions of organic medium and water and the nature of the "onium" additive, particularly its solubility in the two phases, must be chosen to be such that sufficient "onium" additive to promote the hydrodimerisation reaction is retained in the organic medium and that, preferably, sufficient water is used to suspend any precipitated salt to form a slurry which can be physically handled, i.e. pumped and filtered.

In the term "mono-olefinic nitriles" throughout this specification we include acrylonitriles bearing at least one alkyl substituent having up to 4 carbon atoms in the alpha or beta carbon atoms joined by the double bond. However, it is already known from Australian Pat. No. 263,328 and British Pat. 1,063,497 that in respect of hydrodimerisation the alpha, beta mono-olefinic mono- or di-carboxylates as defined in Australian Pat. No. 263,328 are equivalent to the corresponding nitriles. Hence it is within our invention to apply the process as described in an analogous manner to the hydrodimerisation of mono- or di-carboxylates to parafinic di- or tetra-carboxylates. The preferred monomer is acrylo-nitrile which hydrodimerises to adiponitrile.

By "polar aprotic solvent" we mean a liquid of high dielectric constant which is not a proton donor and which under operating conditions is immiscible with the aqueous phase; it may, however, be and usually is partially soluble in water and conversely dissolves a certain amount of water. The solvent should not interfere with the reaction and should not react with the reagents present in the reaction mixture or with the amalgam. Examples of suitable solvents are the alkyl nitriles and alkylene dinitriles such as acetonitrile and adiponitrile, nitrobenzene, sulpholane and other sulphones, dimethyl sulphoxide, dimethyl formamide, dimethylacetonamide and mixtures thereof, always provided that the proportions chosen are such that a separate liquid organic phase is formed in contact with an aqueous phase; other suitable polar aprotic solvents may be used and may be chosen readily by those skilled in the art using the criteria outlined above. Preferred polar aprotic solvents are dimethyl formamide, acetonitrile, adiponitrile and mixtures thereof. By "a major proportion" we mean that the polar aprotic solvent is the basic component of the organic phase, other components such as water acting mainly or entirely as reagents; water for example may act as a source of protons. The polar aprotic solvent will thus normally form more than 50% by weight of the reaction medium and good results are obtained with about 75% by weight or more. For the purposes of calculating weight percent the reaction medium should be taken to consist of organic reactants, solvents and any other additives but does not include amalgam. A typical reaction medium exemplifying the invention will include the acrylonitrile, the polar aprotic solvent, optionally the "onium" additive, water, carbon dioxide as the weak acid (buffering agent) to control the pH and small amounts of by-product.

The polar organic solvent may comprise cosolvents modifying its polarity, water solubility and the solubility of the "onium" additive promoting hydrodimerisation. Thus, when the organic medium is predominantly acetonitrile with little adiponitrile, we prefer to add 0 to 10 parts of a water-insoluble non-polar high boiling hydrocarbon such as e.g. xylene per 70 parts of the acetonitrile so as to depress the solubility of water. The type of the non-polar hydrocarbon and the quantity required to achieve for a given system the desired depression of water solubility in the organic phase is readily determined by simple experimentation; thus e.g. when more than about 50% acetonitrile is used the two phases merge; by addition of small proportions of xylene separation into two phases can be re-established.

Accordingly one preferred version of our process is characterized in that the reaction medium is an organic phase comprising in addition to the polar aprotic solvent, e.g. acetonitrile and/or adiponitrile, a sufficient amount of an inert, water insoluble, non-polar, high boiling hydrocarbon solvent such as e.g. xylene, to maintain said medium as a separate organic phase when contacted with an aqueous phase brought into or close to equilibrium with it. Other similarly acting hydrocarbon cosolvents e.g. toluene, suited to maintain separation of the polar organic solvent phase and the aqueous phase and to obtain the desired solubilities of the "onium" additive can readily be determined by a few experiments.

By "onium additive" we mean a reagent which is a salt capable of forming alkylated cations in the medium e.g. organic ammonium, phosphonium and sulphonium salts, as defined in British Pat. No. 1,063,497. Especially preferred are quaternary ammonium salts. Suitable quaternary ammonium salts are also known from our British Pat. 1,063,497; they include those with at least 3 short chain organic groups on the nitrogen and preferably at least 3 lower alkyl groups e.g. tetraalkyl ammonium salts e.g. halides or sulphonates or sulphates, particularly chlorides with the alkyl groups each having up to 4 carbon atoms. Symmetrical salts such as tetraethyl salts are particularly suitable. The "onium" additive is, of course, inherently required in the organic phase of the reaction medium only; its presence in the aqueous phase is merely a necessary concomitant phenomenon; when a non-polar cosolvent is used in the organic phase, the distribution of the "onium" additive between the water and the organic phase is shifted towards the aqueous phase; the required amount of said additive in the organic phase may then be re-established by judiciously increasing the total amount of said additive in the system.

The amount of "onium" additive in the organic phase may vary over fairly wide ranges, as known from the prior art cited above. The upper concentration is not narrowly critical; it is set by solubility and economic considerations; Table I states the practical operating and the preferred ranges in the organic phase. The corresponding concentration in the aqueous phase is or approaches the equilibrium concentration at the operating condition.

The preferred conditions for the so-called "dense fluidised" mercury bed reactor are defined in our Dutch patent application No. 6,617,641. The preferred alkali metal is sodium. Means for intimately contacting the organic and aqueous phases are known in the art, e.g. agitation tanks, one or more nozzles, spray roses, distributor pipes fitted with orifices or distributor plates, and packed columns.

Acids suitable as pH controlling (and/or buffering) means for neutralisation of the alkali or alkaline earth metal are already known e.g. from British Pat. No. 1,063,-497, e.g. carbon dioxide, phosphoric acid or acetic acid. Our preferred weak acid is carbon dioxide. It may be fed to the reactor either as a gas phase or dissolved in the organic phase or, whenever aqueous phase is present in the reactor, as sodium bicarbonate or these methods may be combined. Optionally, superatmospheric pressure from 1 to 10 atmospheres may be used to increase its solubility in the medium. The quantity of carbon dioxide reacted with the reaction product stream is not narrowly critical provided, however, that in steady state operation—ultimately—a sufficient amount is used to convert the bulk of the sodium reacted in the reactor to sodium bicarbonate, said carbon dioxide concentration being such that the resultant pH throughout the reactor is kept below a value at which the undesired cyanoethylation reaction occurs and provided also, in the case of the above described preferred embodiment of our precess wherein the phase separation between the organic and aqueous phases is facilitated, that the stated minimum concentration of sodium salt in the organic phase is maintained.

Preferably the carbon dioxide content in the reactor and during the transfer from reactor to the extractor in which the aqueous quench is carried out, is maintained below the concentration at which precipitation of solid carbonic acid salts of the alkali or alkaline earth metal, particularly sodium, occurs. To this end the carbon dioxide required to readjust the pH after the uptake of sodium in the reactor is introduced only at or after the aqueous quench (the extraction step). In our most preferred mode of operation we avoid precipitation of the carbonic acid salts of sodium even during the aqueous quench step by using the aqueous phase which is essentially a solution of bicarbonate, as the neutralising agent, and introducing gaseous carbon dioxide only during the subsequent, separate crystallisation of sodium bicarbonate. Accordingly we provide a preferred process which comprises reductively dimerising acrylonitrile and wherein the reductive dimerisation is carried out in a medium comprising a major proportion of acetonitrile, dimethyl formamide or adiponitrile and capable of providing reactive hydrogen by interaction of sodium amalgam with said medium in the presence of a quaternary ammonium cation, wherein the improvement comprises intimately contacting the organic phase reaction-product-exit-stream, after its disengagement from the amalgam with sufficient aqueous phase solution of sodium bicarbonate to extract the sodium from the organic phase without precipitating a salt thereof and, at the same time, to control the pH of the organic phase to a value less than 10.5, separating the organic and aqueous phases while they are substantially free from salt crystals, then, in a separate crystallisation step, precipitating sodium bicrbonate from the aqueous phase by the addition of carbon dioxide and simultaneously adjusting the pH of the aqueous phase to a value between 8.1 and 8.5.

The pH resultant in the aqueous phase after full carbonation, i.e. the pH of aqueous bicarbonate solutions saturated at 30±10° C., is about 8.3 and varies slightly, in a known manner, with temperature and the presence of organic substances in the aqueous phase; while it is within the invention to use a more acidic feed containing free carbonic acid, a pH of 8.3±0.2 is in practice the preferred operating region in the aqueous phase; since the bulk of the aqueous feed is a recycle as further described below it may contain a residual proportion of sodium carbonate, raising the pH somewhat above said lower limit. It is preferable to keep the sodium carbonate concentration in the exit stream from the crystalliser fairly low since in this manner cyanoethylation is avoided and on recycle the capacity to take up sodium from the organic phase is increased.

The upper pH limit is determined by the level of undesired by-products due to the cyanoethylation reaction, essentially oxydipropionitrile, which is economically acceptable. By suppression of the cyanoethylation reaction we therefore mean control within an economically acceptable level. Consequently the upper pH limits stated here may be exceeded if the penalty of oxydipropionitrile formation is accepted and such operation is still within the teaching of this invention.

It should also be noted that the undesired cyanoethylation reaction occurs more readily in the reactor, i.e. in the presence of amalgam; consequently higher pH values can be tolerated in the absence of amalgam both in the aqueous and the organic phase than in the reactor. Thus we prefer to keep the pH in the hydrodimerisation reactor below 9.5, whereas at ambient temperature and in the absence of amalgam in the organic phase, a pH up to 10.5 and in the aqueous phase as pH up to 11.5 can be tolerated for practical residence times and conditions without undue formation of oxydipropionitrile. In the presence of organic solvents in the aqueous phase, particularly when these are present in high concentrations, the pH may be apparent only; throughout this specification we mean by pH the reading of a standard glass electrode pH meter such as e.g. a Titriskope Type E166 "Metrohm" pH meter using a calomel standard reference electrode and a shielded glass electrode of the "Titron A" type and standardised against a buffer solution at a pH of 9.22 at 20° C.

In this specification the invention is exemplified by reference to carbon dioxide and sodium bicarbonate as the preferred neutralising means and as the precipitated salt respectively. It is already known e.g. from British Pat. No. 1,063,497 and French Pats. Nos. 1,456,402 and 1,465,731 that other acids e.g. phosphoric or hydrochloric acid may be used to control the pH in the desired region between 2 and 13, preferably between 6.0 and 10.0 and most preferably between 7.0 and 9.5; using these acids again equivalent amounts of inorganic salts are formed and these, when precipitated from an organic medium, are extremely fine and difficulty filtrable. The transfer treatment of the salt to aqueous media by the process above described is also applicable to these salts and is therefore within the teaching and scope of this invention.

The term "steady state" throughout this specification includes continuous operation with fluctuations of reaction conditions within the operative ranges stated, since in practice not infrequently minor fluctuations may, in fact, occur.

It will be apparent that a wide range of proportions of the main constituents, polar organic solvents, water, acrylonitrile and "onium" will satisfy the conditions set out above for the composition of the organic phase fed to the reactor. In practice highly satisfactory operation has been obtained with the range of operative and preferred proportions set out in Table I (wt. percent) which does not include minor constituents, organic impurities and by-products, carbon dioxide, sodium carbonate or sodium bicarbonate, and which is not to be construed as narrowly critical or narrowly limiting. Because of the multiplicity of main constituents in the system, e.g. 4 or, when acetonitrile and xylene are used, 6 distributions of each component between the two phases cannot be predicted precisely or expressed mathematically in simple terms. Yet within the broad regions indicated in Table I as desirable compositions of the organic phase, satisfactory operating conditions can be readily established by setting the two phases approximately in the concentrations expected to yield the desired composition of the organic phase and allowing the system to equilibrate; minor further adjustment can readily be made if the equilibrium attained initially is to far from the desired level of one or the other principal component. The non-polar solvent, in particular can be used to repress the water level, acetonitrile increases the water solubility in the organic phase, and by increasing the total quantity of "onium" additive in the system its concentration in the organic phase may be raised.

The quantity of aqueous phase mixed with the organic phase leaving the reactor is dependent on the composition of the phases, and the operation of the reactor and the extractor. In a particular set of these conditions, the flow must be sufficient to attain the alkali or alkaline earth particularly sodium concentration which has previously been specified for the organic phase leaving the extractor. We have found that flow ratios of organic to aqueous phase in the range of 20:1 to 1:5 are operative; however, at ratios approaching 20:1 sodium extraction efficiency falls off and the addition of seed crystals to the crystalliser becomes desirable whereas near the 1:5 ratio a large crystalliser, large separator and large pumping capacity would be required. Hence, more preferred limits are 5:1 to 1:1.

The operation of the crystalliser is important for the growth of large sized crystals. Thus accepted crystalliser practice known from the prior art must be followed; the metastable region for sodium bicarbonate solubility must not be entered.

In addition to the known desiderata for crystallisation processes we have found in this particular instance that it is desirable to keep the aqueous solution (mother liquor) in the crystalliser close to saturation with respect to carbon dioxide; furthermore we have found that good sized crystals were formed e.g. at growth rates of 50 gms. $NaHCO_3$/hr./litre on a crystal surface area between 2000 and 4000 cm.$^2$/litre. These figures may vary with both plant design and operating conditions; thus ratios of the total weight of the aqueous phase in the crystalliser to weight of sodium bicarbonate crystals formed per hour of 5:1 to 50:1 are convenient, while 8:1 to 20:1 is preferred.

The said salt crystallised in the crystalliser is separated from the mother liquor by conventional filtration. As stated, it is preferred but not necessary that the filtrate is free from crystals. Handling of the crystals between the crystalliser and the solids separation step is conventional. The characteristics of the solids separation system e.g. control valves, slurry lines, centrifuge or vacuum filter, determine the desirable ratio of aqueous phase to solids. Ratios of 50:1 to 2:1 are convenient, while 20:1 to 4:1 are preferred, but these ratios are not narrowly critical. Since in our preferred embodiments large crystals can be attained, cheap and convenient gravity settling of the crystals is possible which permits decantation of some of the mother liquor, free from crystals, from the crystalliser.

As apparent from Table I we prefer to incorporate an organic non-polar solvent in the polar solvent whenever large amounts of highly water soluble polar aprotic solvent such as acetonitrile is used in the organic phase. Xylene is particularly suitable because it does not form difficulty separable azeotropes in the subsequent work-up of the dimerised product.

Apart from the above stated desideratum that the delay between the time when the reaction mixture disengages from the amalgam and the contacting with the aqueous phase occurs should be minimal, the position of the point of mixing is not critical; a separate mixing vessel close to the reactor or, optionally, as stated, directly above the reactor and linked with it into one unit, to which vessel the organic and aqueous phases are fed in the desired proportions, is convenient. Optionally during or after mixing the two liquid phases may be cooled, so as to reduce the water content in the organic phase, before they are separated in a phase separator.

Amongst the advantages of our process are: the precipitation of the sodium salt e.g. bicarbonate in large crystals; greater ease and higher rate of filtration of the sodium salt slurry; substantial reduction of the amount of organic material and of mercury occluded on the sodium salt filter cake; prevention of scaling on walls of reactor and transfer lines, and the prevention of deposition of salt crystals in lines and equipment other than the crystalliser and centrifuge basket. Further advantages of our preferred method of operation in which the formation of salt crystals in the reactor is avoided are: reduced heat release in the reactor, permitting reduced rates of organic recycle; increased efficiency in the separation of the two phases, and ease of pH control; finally, in the case of sodium bicarbonate, the filter cake is suitable for purification and work-up to a non-toxic saleable light sodium carbonate (soda ash) cake. A further advantage peculiar to the case when a polar aprotic solvent e.g. acetonitrile is used in addition to adiponitrile and in excess of 10 to 15% of the organic phase is that the overall reaction rate in this system is 2 to 5 times faster than when adiponitrile alone is used as the polar organic solvent; with these proportions of acetonitrile the desired optimum concentrations of water and of the "onium" additive and, whenever high proportions of acetonitrile in the organic phase are used, say near or above 75%, even the separation into two phases may not be maintained; hence, for such a system, the advantages of the treatment with the aqueous phase may be attainable only on addition of a non-polar co-solvent; thus use of the latter permits a 2 to 5 fold increase in reaction rate.

By way of illustration the invention is now described in one embodiment; this was used in Examples 2 and 4. A further, preferred embodiment is described in Examples 5 to 23.

Figure 2:
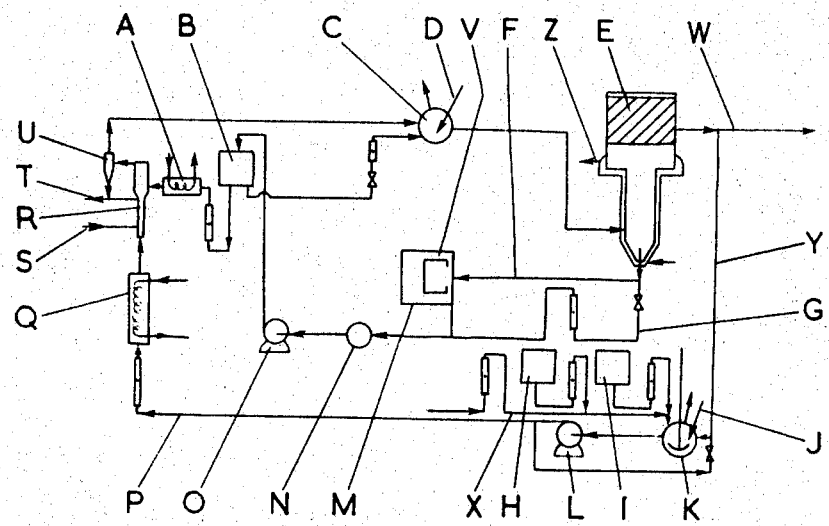

For comparison FIG. 1, which is a schematic flow sheet, shows the process according to our Dutch patent application No. 6,617,641 and Dutch patent application No. 6,613,474 as operated prior to the present invention; FIG. 2, which is a schematic flow sheet, describes the present invention in which an aqueous phase is contacted with an organic phase. In FIG. 2 metered, recycled aqueous phase is injected into the reactant organic liquor stream either in the mixing chamber C or at the point where it leaves the fluidised bed in reactor R or at both points. Amalgam prepared outside the system shown is admitted to reactor R through lines S and the spent amalgam leaves via stream T. The reactor and its design is as described in our Dutch patent application No. 6,617,641 FIG. 1. The temperature of the injected aqueous phase is adjusted by means of heat exchanger A. After passing through a hydroclone U, where any entrained mercury is seperated, the organic/aqueous phase mixture is passed into a contacting unit C which facilitates mass transfer from the organic phase to the aqueous phase. Contacting unit C is equipped with a stirrer and a dispersion nozzle through which carbon dioxide is admitted from line D. From vessel C the unified stream of the aqueous and organic phases passes into a jacketed separator E provided with elongated cylindrical top and bottom sections, where separation of the less dense organic phase from the aqueous phase takes place. Part of the organic phase comprising the organic reaction product is drawn off through stream W. The aqueous phase in separator E is cooled to the desired crystallisation temperature by means of a jacket Z, and crystallisation of sodium bicarbonate is completed here. The aqueous sodium bicarbonate slurry settles towards the bottom of vessel E and is passed into a basket centrifuge M, where the solids are centrifuged on bowl V. The aqueous filtrate then passes through delay vessel N and is recycled by means of pump O to a head tank B; from there it flows at a controlled and metered rate to the points of injection. Optionally a regulated proportion of clear aqueous phase or of slurry may be fed into the aqueous injection stream to increase the aqueous phase/organic phase ratio or to induce larger crystal growth respectively by by-passing the centrifuge through stream G. a controlled and metered flow of reactant acrylonitrile is admitted to vessel K from stock tank H. Make-up aqueous quaternary ammonium salt solution to replace any quaternary salt retained on the centrifuge cake or removed from the system in product stream W is metered to vessel K from stock tank I and make-up water, replacing the water of reaction and the water removed from the system on the centrifuge cake and in product stream W, is metered to vessel K through stream X. A vented mixing vessel K is provided to bring the recycled organic stream Y into intimate contact with the make-up streams X, H and I and with carbon dioxide which is injected through line J. Pump L, provided with a by-pass to the suction side for flow control, recycles the metered reactant organic phase P to the reactor R; the temperature of the feed P is regulated in heat exchanger Q.

The organic phase product stream W comprising the product adiponitrile, the polar organic solvent, e.g. an acetonitrile/xylene mixture or acetonitrile together with some water, optionally some unreacted acrylonitrile and some specific surface active additive is worked up into its components by conventional means e.g. distillation, the product is separated and the reactants and auxiliary agents are re-used in the make-up of the process. Similarly sodium bicarbonate and the adsorbed organic material and mercury may be separated and recovered individually.

FIG. 1 demonstrates the arrangement of the apparatus used to carry out the continuous hydrodimerisation reaction of acrylonitrile in a similar manner, where crystallisation of sodium bicarbonate takes place in the reactant organic phase alone, in the absence of an aqueous phase. The equipment designated with the same letters as in FIG. 2, corresponds to that illustrated in FIG. 2, but the units and recycles associated with the aqueous phase and its separation are omitted.

Our invention is now illustrated by but not limited to the following examples:

EXAMPLES 1–4

Examples 2 and 4 demonstrate the process according to this invention: Examples 1 and 3 are control experiments in the absence of an aqueous circuit to demonstrate the advance provided by the present invention.

Using the apparatus described in the body of the specification and illustrated by FIGS. 1 and 2 the following conditions were established in Examples 1 to 4 inclusive.

Amalgam, containing 0.3 w./w. percent sodium was admitted at a flow rate of 20 ml./min. to the fluidised bed reactor R (FIGS. 1 and 2). An organic reactant phase was recycled through the reactor at the rate of 800 ml./min. so as to achieve aggregative fluidisation as described in our Dutch patent application No. 6,617,641 in a cylindrical, dense amalgam bead 7″ deep and ½″ diameter. The concentration of acrylonitrile, which was stabilized by a trace of p-nitrosodimethylaniline and the concentration of tetraethylammonium chloride were maintained constant for each run by continuous controlled addition of make-up. Carbon dioxide in excess of the quantity required for conversion of all sodium formed in the reactor to sodium bicarbonate was admitted continuously to the mixing vessel K (FIGS 1 and 2) so as to saturate the organic reactant phase. Reactor temperature measured in the disengagement space of the reactor R (FIGS. 1 and 2) was maintained at 40° C. by means of heat exchanger Q (FIGS. 1 and 2). Entrained mercury from the reactor was removed in hydroclone U (FIGS. 1 and 2). Sodium conversion in all runs was 100%. The rate of filtration of the sodium bicarbonate precipitated was measured under standardised conditions on a 2″ diameter standard Buchner funnel under suction at a controlled pressure drop across the filter of 4 p.s.i. applied from a vacuum pump, and using two No. 4 "Whatman" standard filter papers 4.25 cms. diameter. Crystals were sampled from the circulating organic phase, centrifugal cake and Buchner funnel cake.

EXAMPLE 1

This example was a control run for comparison with Example 2.

The plant was operated with the arrangement illustrated in FIG. 1 and described in the body of the specification. An adiponitrile organic reactant phase comprising the components set out below and expressed in percent w./w. was recycled through stream P shown in FIG. 2: adiponitrile 84.0, acrylonitrile 6.8, oligomeric impurities 1.0, propionitrile 0.5, water 5.7, tetraethylammonium chloride 2.0. The concentration of solid sodium bicarbonate salt in the aqueous stream F was maintained at approximately 5% w./w. and the solid sodium bicarbonate was removed at its rate of production on bowl V; the filtrate was returned to the recycle stream P. Results, particularly crystal size, filtration rates obtained and impurities adsorbed on the filter cake are given in Table II.

Operation was possible for 30 minutes only before serious scaling of plant equipment occurred and enforced intermittent shut-down of the pilot plant.

EXAMPLE 2

In this experiment the plant was operated with the arrangement illustrated in FIG. 2 and described in the body of the specification.

The adiponitrile reactant organic phase was recycled through the reactor R, and immediately above the dense amalgam phase a recycled aqueous phase, maintained at 35° C. by means of heat exchanger A, was injected at the rate of 150 ml./min. This injected stream was the aqueous filtrate recycled to the process from centrifuge M and containing 15% w./w. tetraethylammonium chloride together with acrylonitrile, adiponitrile, propionitrile, some oligomeric impurities, sodium bicarbonate in water, and some carbon dioxide. The intimately mixed phases were then passed into a stirred vessel and saturated with carbon dioxide before passing to separator E maintained at 34° C. Here the crystals of sodium bicarbonate were allowed to accumulate in the aqueous phase. A residence time of 3 minutes was allowed for the organic phase in the separator. Aqueous sodium bicarbonate slurry was drawn from the bottom of the separator at a point slightly above the base to avoid contamination with traces of entrained mercury, and at a sufficient rate to maintain an approximate concentration of 5% w./w. of sodium bicabonate in the slurry.

The plant was operated for normal shift periods of 8 hours without serious scaling or blocking and fast filtration rates and purer filter cake were obtained, as set out in Table II.

EXAMPLE 3

This experiment was a control run for comparison with Example 4. It was carried out under the conditions of Example 1 but the organic phase from which crystallisation took place was an adiponitrile/acetonitrile/xylene mixture of the composition shown in Table III. The pilot plant could not be successfully operated for more than 30 minutes before scaling occurred and enforced serious delay in production rate and intermittent plant shut-down.

EXAMPLE 4

This example demonstrating the present invention was carried out under the conditions of Example 2 but the organic phase was an adiponitrile/acetonitrile/xylene mixture in contact with an aqueous phase and having the composition given in Table III. Again the plant was operated satisfactorily for the full shift periods of 8 hours without serious scaling occurring and improved rates of reaction, filtration rate and purity of the filter cake were obtained, as set out in Table II.

Experiments 2 and 4 were repeated in a statistically designed experiment involving 16 experiments and the benefits in crystal growth, filtration rate and purity were shown to be highly significant (3 standard deviations level).

EXAMPLES 5–23 INCLUSIVE

Examples 5 to 23 inclusive demonstrate preferred embodiments of the present invention.

The apparatus used was as described in Example 2 and shown schematically in FIG. 2 but for the following changes: The carbon dioxide entry line (dispersion nozzle) D into contacting unit C, the hydroclone U and the recycle line from aqueous phase head tank B through heat exchanger A to reactor R were removed; the contacting unit C consisted of an unpacked Schiebel column and the separator E was replaced by two vessels, a phase separator E′ and a crystalliser E″.

The disengagement space in reactor R was sufficiently large to permit complete disengagement of the organic phase from the amalgam phase; the Schiebel column (contacting unit) C was a cylindrical column provided at the bottom with an inlet for the aqueous and organic phases and at the top with an outlet for the dispersion; the column contained three baffled mixing compartments, each with four baffles against the cylindrical wall and a centrally placed turbine impellor to give maximum mixing of the aqueous and organic phases throughout the length of the column. Phase separator E′, of conventional design, was a closed cylindrical mild steel vessel 8″ high and 4″ in diameter, fitted with a second concentric tube 7½″ long and 1½″ in diameter. The bottom of this tube was open and cleared the base of the separator by ½″; both vessels had a common vent provided with a condenser. Separator E′ had three standpipes, all passing through the bottom of the vessel and of adjustable height; one inlet for the mixed phases and one outlet for the organic phase were poitsioned in the annulus formed by the cylinders, and one outlet for the aqueous phase was in the centre of the inner cylinder. The level of the standpipe inlet for the organic phase was about ½″ above that of the aqueous phase and 7¼″ above the base of the separator; the cylinder walls operated as a baffle smoothing flow turbulence during the phase separation. Separator E′ also had an outer water jacket for temperature control.

Crystalliser E″ was a cylindrical mild steel vessel 15″ high and 10″ in diameter with a conical base, provided with an outer water cooling jacket, a wide concentric outlet from the conical base suitable for discharge of solid crystals, a liquid inlet at the top, a stirrer positioned in the centre of the vessel with two sets of blades; concentrically with the stirrer and around the circumference of the blades of said stirrer, at a clearance of about ¼″ from the blades, a cylindrical tube was positioned which acted as a draft tube when the stirrer was rotating, thus causing liquid to circulate from the annulus between the crystalliser and the draft tube up into the draft tube. In addition four small 1/10″ internal diameter tubes were provided for introducing carbon dioxide to the bottom of the draft tube. This was the main point of introduction of carbon dioxide, although in some experiments carbon dioxide was also introduced through line J.

In operation organic phase P, essentially free from aqueous phase, was fed to reactor R; the heat exchanger Q was used to adjust the temperature of the organic phase to the desired level for the inlet to the reactor. Organic phase P reacted in reactor R; the reactant exit stream substantially disengaged from amalgam was rapidly transferred to the aqueous and organic phase mixing point at the bottom of the Schiebel column C described above, where intimate contact between the phases was achieved. From the Schiebel column C the dispersion of the two phases passed into jacketed separator E′ where the aqueous and organic phases were separated into a less dense organic phase stream Y, from which the product stream W is split off, and an aqueous phase stream passing to crystalliser E″. Temperature in the latter was controlled to ±2° C., carbon dioxide was introduced under controlled circulation and turbulence through the draft tube to achieve the pH stated in Table IV and sodium bicarbonate was precipitated and allowed to settle to the conical bottom of the crystalliser. From there crystal slurry stream F was discharged into centrifuge M, separated on bowl V and the clear filtrate was combined with decanted clear mother liquor stream G from the top of the crystalliser and recycled to head tank B and contacting unit C as already described above. From stream W the product, adiponitrile, and unreacted reactants and additives, particularly acrylonitrile, "onium" additive and, when used, xylene, together with some water were recovered by distillation. Carbon dioxide usually was introduced to the crystalliser E″ only, although in Examples 8 and 15 controlled quantities of carbon dioxide were added to the organic phase through line J. pH metering points were provided above the reactor R at the outlet from the Schiebel column C, in the organic and the aqueous phases of separator E′ and in the exit stream from crystalliser E″.

Examples 5 to 23 show the benefit of crystal growth, crystal purity, particularly the low content of mercury and acrylonitrile, the ease of operation, high rate of filtration and freedom from crystal blockages in the transfer lines and operating units.

Throughout Examples 5 to 23 inclusive the composition of the organic phase was as shown in Table V. The aqueous phase was in equilibrium with it. It will be understood that these figures are subject to the analytical error range plus fluctuations due to moderate variations of conditions during a prolonged run; thus we would expect the true figures to be within ±5% relative, i.e. an adiponitrile figure of 60 would be expected to be 60±3%.

The other operating characteristics are given in Table IV. In all Examples 5 to 23 inclusive, at the beginning of each experiment, seed crystals were used to promote crystallisation. Crystal samples, unless otherwise stated, were taken from the crystalliser. In general, crystals from the centrifuge were one-half to one-third the length of crystals taken from the crystalliser, because of fracturing during centrifuging.

Examples 5 and 6 demonstrate the process in which, by control of sodium level in the organic phase and effective extraction in the Schiebel column, precipitation of crystals in the lines and vessels other than the crystalliser was avoided. No scaling or blockages were observed. In Example 7, by contrast, the extraction of sodium from the organic phase was less efficient, Na concentration in excess of 0.5 mole/litre some crystals precipitated in the lines. However, the process was operative and in all other aspects satisfactory.

Example 8 demonstrates the addition of carbon dioxide at two points, in the crystalliser and to the organic phase (at point J in FIG. 2) without precipitation of crystals outside the crystalliser. The pH in the organic phase was marginally reduced.

Example 9, for comparison, was carried out as Example 8 but without $CO_2$ injection at point J. Operation in both examples was satisfactory and no scaling or blockage occurred.

Examples 10 to 18 inclusive demonstrate the effect of increasing the ratio or organic to aqueous phase in the extraction step (aqueous quench). At very high ratios the extraction efficiency decreases, Na concentration in the organic phase exceeds the preferred limit and crystallisation occurs outside the crystalliser; also the pH in both phases becomes too high and eventually at ratios in excess of 20:1 uncontrolled scaling and blockages may occur. In Example 11 the feed-rate of amalgam to the reactor was temporarily raised to establish the limit at which precipitation of Na salts from the organic phase during transfer from reactor to Schiebel column C could still be preventd. 2.2 w./w. of Na was obtained without crystal formation. In Example 15 some carbon dioxide was also added at point J to improve pH control in the organic phase. No crystals were formed outside the crystalliser.

In Example 11 the mercury occluded in the wet crystals was determined and stated as weight parts per million parts of sodium bicarbonate.

In Example 19 at a low ratio of organic to aqueous phase, the sodium in the organic phase was removed below the level at which phase sparation is facile. Decreasing the extraction efficiency slightly in Example 20, facile phase separation was re-established. Similarly in Example 21 phase separation was satisfactory, but after a marginal increase in aqueous quench recycle flowrate to 910 mls./ min. and concomitant reduction in Na content in the organic exit stream from the Schiebel column, phase separation again became slower.

In Example 22 a delay vessel was installed between reactor R and Schiebel column C in such a manner that the transfer time of organic phase from reactor R to Schiebel column C was controllable. With transfer times from R to C up to 20 seconds no crystal formation was observable. In all respects operation was satisfactory.

In Example 23 which was run over a prolonged period, a full analysis and material balance were carried out so as to establish yields with high accuracy. Results are given in Table IV. In all experiments 5 to 23 the yields of adiponitrile were very similar to or identical with those of similiar experiments carried out without the aqueous quench.

The rate of filtration was determined in Example 23 as follows: The sodium bicarbonate cake from Example 23 was slurried in the aqueous mother liquor, after. The supersaturation with sodium bicarbonate of the latter had been reduced to zero the slurry was passed into a filter For comparison the cake resistance of the sodium bicarbonate crystals formed in the organic phase, i.e. without an aqueous quench extraction system, was determined. It was found that under otherwise similar conditions the cake resistance was about 200 times greater, namely $8.4 \times 10^{10}$ cm./gm. at 10 p.s.i. pressure drop.

The slurry leaving the crystalliser from Examples 21 and 23 was centrifuged on a 10″ diameter bowl, rotating at 1500 r.p.m. The slurry feed was stopped for a period of time while the cake was spun until no further filtrate came off. Samples of the wet cake removed by the centrifuge knife after spinning were taken and analysed. For comparison the same procedure was carried out with crystals formed in the organic phase. The results given in Table VI based on dry cake weight show the vastly decreased contamination in Examples 21 and 23.

The average mercury content of the four results quoted in Examples 5–23 is 10 p.p.m. in the unwashed centrifuge cake. The cake formed from crystals that were grown in the organic phase during passage through the reactor had a mercury content in the range from 1000 to 10,000 p.p.m.

TABLE I.—OPERATIVE AND PREFERRED PROPORTIONS

| | No. | Polar organic solvent phase (a) Acetonitrile | (b) Adiponitrile | (c) Non-polar co-solvent e.g. xylene | (d) Acrylonitrile | (e) "Onium" additive | (f) Water |
|---|---|---|---|---|---|---|---|
| Operative proportions. | 1 | Balance to 100 | $0.2<b=100-(a+c+d+e+f)$. $a+b>50$ | 0–10 | 0.1–30 | 0.1–15—the upper limit being defined by the partitioning of (e) between the aqueous and organic phases. | The water concentration can be progressively increased or decreased by either substituting (a) for (b) or by addition of (c) respectively within the prescribed limits. Thus operative proportions can be.—0.1–18. |
| Preferred proportions. | 2 | | $b>0.2$ $a+b>60$ | 0–10 | 1–15 | 0.3–15 | 1–15. |
| Preferred proportions. | 3 | | $b>2$ $a+b>70$ | 0–10 | 1–12 | 0.5–10 | 2–15. |
| Optimum proportions. | 4 | $a<40$ | $a+b>75$ | 0–5 | 1–10 | 0.5–8 | 2–8. |

TABLE II.—THE EFFECT OF INJECTION OF A RECYCLED AQUEOUS PHASE ON CRYSTAL SIZE, FILTRATION TIME AND MERCURY CONTAMINATION OF SOLID SODIUM BICARBONATE

| Reactant organic phase | Example | Degree scaling | Sample taken from— | Crystals Avg. size, μ | Habit | Filtration data Cake wt., gms. | Liquor volume mls. | Time, mins. to filter | Mercury content dry basis, p.p.m. |
|---|---|---|---|---|---|---|---|---|---|
| Adiponitrile | 1. Control experiment | Great | Solution | 1–4 | Needless | | | | |
| | | | Buchner cake | | | 40 | 1,200 | 15 | |
| | | | Centrifuge cake | | | | | | 4,400 |
| | 2. Aqueous injection | Small | Solution | 55–65 | Needles | | | | |
| | | | Buchner cake | | | 47 | 610 | 3 | |
| | | | Centrifuge cake | | | | | | 100 |
| Adiponitrile/acetonitrile/xylene | 3. Control experiment | Great | Solution | 1–2 | Needles | | | | |
| | | | Buchner cake | | | 33 | 780 | 30 | 2,400 |
| | 4. Aqueous injection | Small | Solution | 40–50 | Needles | | | | |
| | | | Buchner cake | | | 34 | 350 | 1¾ | 150 |

7⅜″ diameter by 14″ high. The crystals were allowed to settle, and the mother liquor was run through the cake and filter cloth until a constant flowrate of filtrate was obtained.

These experiments were carried out for 216, 432 and 648 grams of dry sodium bicarbonate at pressures of 0.2, 5, 10, 20 and 40 p.s.i. across the cake and the filter cloth. In all examples the filter cloth had a negligible resistance.

Filter cake resistance $\alpha$ was $\alpha = 4.4 \times 10^6 p^{0.29}$ for the 432 gm. sample
$\alpha = 9.8 \times 10^6 p^{0.31}$ for the 216 gm. sample
$\alpha = 16.1 \times 10^6 p^{0.31}$ for the 648 gm. sample
   $p =$ dynes/cm.$^2$
   $\alpha =$ cm./gm.

i.e. cake resistance is between $1.6 \times 10^8$ and $1.6 \times 10^9$ gm./cm. for the pressures measured.

TABLE III.—COMPOSITIONS FOR "ADIPONITRILE/ACETONITRILE/XYLENE" ORGANIC PHASE IN CONTACT WITH IT CORRESPONDING AQUEOUS PHASE

| Component | Approximate, w./w. percent composition Organic phase | Aqueous phase |
|---|---|---|
| Adiponitrile | 57.0 | |
| Acetonitrile | 25.0 | |
| Water | 6.0 | |
| Tetraethylammonium chloride | 2.0 | 15 |
| Oligomeric impurities | 0.7 | |
| Acrylonitrile | 7.0 | |
| Propionitrile | 0.3 | |
| Xylene | 3.0 | |
| $NaHCO_3$ | Negligible | |

TABLE IV

| Ex. No. | Period of running in minutes | Aqueous phase, pH Entering extractor | Aqueous phase, pH Leaving extractor | Organic phase leaving extractor pH | Organic phase leaving extractor Na concentration, mole/litre | Flow rates Flow organic phase, ml./min. | Flow rates Flow aqueous phase, ml./min. | Mols Na reacted/min. | Temperatures, °C. Crystalliser | Temperatures, °C. Phase separator | Temperatures, °C. Extractor | Crystals Mercury content, p.p.m. | Crystals Average length, microns | Crystals Average diameter, microns |
|---|---|---|---|---|---|---|---|---|---|---|---|---|---|---|
| 5 | 340 | 8.6 | | 9.7 | 0.2 | 820 | 730 | 0.0942 | 32 | 45 | 42 | | 250 | 10 |
| 6 | 110 | 8.6 | | 9.8 | 0.3 | 820 | 1,030 | | | | | | 450 | 20 |
| 7 | 205 | 9.1 | | | 0.6 | 820 | 1,200 | | | | | | | |
| 8 | 310 | 8.4 | | 9.8 | | 820 | 850 | | | | | | 200 | 8 |
| 9 | 240 | 8.5 | 8.8 | 10.4 | | 820 | 850 | 0.094 | 37 | 50 | 55 | | 350 | 10 |
| 10 | 125 | 8.5 | 9.8 | | 6.7×10⁻² | 920 | 970 | 0.11 | 31 | 44 | 39 | | | |
| 11 | 215 | 8.5 | 10.2 | | | 1,300 | 680 | 0.15 | 31 | 47 | 41 | 6.3 | 300 | 14 |
| 12 | 90 | 8.4 | 10 | | | 1,300 | 580 | 0.15 | 37 | 50 | 55 | | | |
| 13 | 125 | 8.4 | 10.2 | 8.7 | 2×10⁻³ | 1,300 | 460 | 0.14 | 31 | 50 | 42 | | | |
| 14 | 75 | 9.0 | >11 | 10.0 | | 1,300 | 320 | 0.14 | 30 | 42 | 41 | | | |
| 15 | 95 | 8.4 | 10.6 | 9.7 | 0.28 | 1,300 | 290 | | 31 | 52 | 44 | | | |
| 16 | 95 | 8.4 | 10.7 | | 0.18 | 1,300 | 180 | 0.14 | 31 | 52 | 44 | | | |
| 17 | 90 | 8.5 | >11 | 11.2 | | 1,300 | 130 | 0.14 | 31 | 45 | 45 | | | |
| 18 | 35 | 9.3 | >10.7 | 11.5 | 0.8 | 1,300 | 70 | 0.14 | 27 | 55 | 45 | | | |
| 19 | 235 | 8.3 | 10.3 | 9.1 | 1×10⁻³ | 1,300 | 450 | 0.15 | 21 | 31 | 33 | | | |
| 20 | 235 | 8.3 | 10.3 | 9.8 | 8.3×10⁻² | 1,300 | 450 | 0.15 | 21 | 31 | 33 | 14.6 | 350 | 20 |
| 21 | 245 | 8.2 | 10.0 | 8.9 | 6.7×10⁻² | 1,300 | 820 | 0.15 | 21 | | 31 | 6.0 | 150 | ¹15 |
| 22 | 270 | 8.3 | 10.5 | 9.9 | | 1,300 | 580 | 0.14 | 24 | 37 | 57 | | 150 | (¹) |
| 23 | 360 | 8.2 | 10.4 | 10.3 | 8.3×10⁻² | 1,300 | 980 | 0.15 | 22 | 33 | | 12.1 | 175 | ¹15 |

¹ Crystals from centrifuge cake.

NOTE.—Example 23—Yields on acrylonitrile to: Adiponitrile=94.8% w./w.; Propionitrile=3.4% w./w.; Oxydipropionitrile 0.9% w./w.; Trimer and tetramer=0.9% w./w.: Sodium yield to adiponitrile=93.1% w./w.

TABLE V.—COMPOSITION OF ORGANIC PHASE

| Ex. No. | Adiponitrile | Acrylonitrile | Acetonitrile | TEACl¹ | Xylene | Water | Impurities |
|---|---|---|---|---|---|---|---|
| 5-22 incl | 72±4 | 6.5±1 | 7.5±4 | 3.5±0.5 | 2.5±0.5 | 4.0±0.5 | 2.5±1 |
| 23 | 75.8 | 8.7 | 6.4 | 3.8 | 0 | 4.0 | 1.3 |

¹ TEACl=Tetraethylammonium chloride.

TABLE VI

| | Crystals formed in the organic phase, grams | Cake from—Example 21, grams | Cake from—Example 23, grams |
|---|---|---|---|
| NaHCO₃ | 100.0 | 100.0 | 100.0 |
| ADN ¹ | 31.3 | 0.52 | 0.9 |
| ACN ² | 2.8 | 0.25 | 0.44 |
| ATN ³ | 3.8 | 0.5 | 0.7 |
| H₂O | 1.7 | 11.6 | 13.7 |
| QAS ⁴ | 1.6 | 2.9 | 3.5 |

¹ ADN=Adiponitrile.
² ACN=Acrylonitrile.
³ ATN=Acetonitrile.
⁴ QAS=Quaternary ammonium salt=tetraethylammonium chloride.

We claim:

1. In a process of reductive dimerisation of acrylonitrile to prepare adiponitrile wherein a liquid reductive dimerisation medium containing the starting material is contacted as an organic phase under conditions of turbulent motion with an alkali metal amalgam and alkali metal transferred from the amalgam phase to the organic phase during the dimerisation reaction is neutralized with carbon dioxide, the improvement which comprises extracting the alkali metal present in the neutralised organic phase by contacting the organic phase with a separate aqueous phase and then recovering the alkali metal from said aqueous phase as the bicarbonate salt.

2. A process according to claim 1 wherein the reductive dimerisation medium is an organic phase containing as sole essential components, the acrylonitrile, water as a proton source, organic solvent of which at least 50% by weight of said organic medium is a polar aprotic solvent together with a non-polar water-immiscible hydrocarbon solvent added to maintain said medium as a separate organic phase when contacted with said aqueous phase.

3. A process according to claim 1 for the reductive dimerisation of acrylonitrile wherein the reductive dimerisation is carried out with sodium amalgam in the presence of a tetraalkyl ammonium salt of which at least three of the alkyls are lower alkyls to obtain an organic phase containing the adiponitrile reaction product and an amalgam phase and separating these two phases from each other, the improvement which comprises intimately contacting the organic phase containing the reaction product after its separation from the amalgam, with an aqueous solution of sodium bicarbonate as the aqueous phase to extract the sodium from the organic phase without precipitating a salt thereof in the aqueous phase and to reduce the pH of the organic phase below a value of 10.5, separating the resulting organic and aqueous phases while they are free from salt crystals, splitting the separated organic phase into a recycle stream and a recovery stream, recycling the recycle stream for further contact with the amalgam and separating adiponitrile from the recovery stream and treating the separated aqueous phase with carbon dioxide in order to adjust the pH to 8.1 to 8.5 and to precipitate the sodium present therein as sodium bicarbonate.

4. A process according to claim 2 wherein the quantity of aqueous phase used for contacting the organic phase is at a ratio between 20 and 0.2 volumes of organic phase per volume of aqueous phase and precipitation of sodium bicarbonate from the aqueous phase is carried out in a separate crystalliser at a rate of 1 part by weight per hour for every 8 to 20 parts by weight of aqueous phase in the crystalliser.

5. A process according to claim 2 wherein the polar aprotic solvent is selected from the group consisting of acetonitrile, dimethylformamide and adiponitrile.

References Cited

UNITED STATES PATENTS 3,193,574 7/1965 Katchalsky et al. ___ 260—465.8
3,356,708 12/1967 Davies et al. _____ 260—465.8

JOSEPH PAUL BRUST, Primary Examiner

U.S. Cl. X.R.

23—63, 64; 260—465.1, 465.6, 485